(12) United States Patent
Ou

(10) Patent No.: US 11,630,580 B2
(45) Date of Patent: *Apr. 18, 2023

(54) FLASH CONTROLLERS, METHODS, AND CORRESPONDING STORAGE DEVICES CAPABLE OF RAPIDLY/FAST GENERATING OR UPDATING CONTENTS OF VALID PAGE COUNT TABLE

(71) Applicant: Silicon Motion, Inc., Hsinchu County (TW)

(72) Inventor: Hsu-Ping Ou, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 58 days.

This patent is subject to a terminal disclaimer.

(21) Appl. No.: 17/152,812

(22) Filed: Jan. 20, 2021

(65) Prior Publication Data
US 2021/0141537 A1 May 13, 2021

Related U.S. Application Data

(63) Continuation of application No. 16/036,954, filed on Jul. 17, 2018, now Pat. No. 10,936,199.

(51) Int. Cl.
G06F 12/00 (2006.01)
G06F 13/00 (2006.01)
G06F 3/06 (2006.01)

(52) U.S. Cl.
CPC .......... *G06F 3/0611* (2013.01); *G06F 3/064* (2013.01); *G06F 3/0658* (2013.01); *G06F 3/0679* (2013.01)

(58) Field of Classification Search
CPC ...... G06F 3/0611; G06F 3/064; G06F 3/0658; G06F 3/0679
USPC ........................................................ 711/154
See application file for complete search history.

(56) References Cited

U.S. PATENT DOCUMENTS

| | | | | |
|---|---|---|---|---|
| 5,361,228 A * | 11/1994 | Adachi | ................ | G11C 16/102 365/230.01 |
| 5,617,393 A * | 4/1997 | Itami | ................... | G11B 7/00736 |
| 5,682,499 A * | 10/1997 | Bakke | ................. | G06F 11/1435 711/100 |
| 6,175,906 B1 * | 1/2001 | Christie | ............. | G06F 12/1063 711/144 |
| 6,839,873 B1 * | 1/2005 | Moore | ............. | G01R 31/31704 326/38 |

(Continued)

FOREIGN PATENT DOCUMENTS

| | | |
|---|---|---|
| CN | 101571832 A | 11/2009 |
| CN | 102262594 A | 11/2011 |

(Continued)

*Primary Examiner* — Sheng Jen Tsai
(74) *Attorney, Agent, or Firm* — Winston Hsu

(57) ABSTRACT

A method of a flash controller to be coupled between a flash memory device and a host device is provided. The flash memory device has a plurality of blocks each having a plurality of pages, and the method comprises: receiving a trim/erase/unmap command from the host device; obtaining a storage space, which is to be erased, from the trim/erase/unmap command; comparing a space size of the storage space with a threshold to determine whether the space size is larger than the threshold; and resetting valid page counts of the plurality of blocks of the flash memory device when the space size is larger than the threshold.

19 Claims, 5 Drawing Sheets

(56) References Cited

U.S. PATENT DOCUMENTS

| | | | | |
|---|---|---|---|---|
| 7,984,303 B1* | 7/2011 | Ma | ............................ | G06F 21/32 726/28 |
| 8,219,781 B2* | 7/2012 | Lee | ...................... | G06F 12/0246 711/208 |
| 2004/0225873 A1* | 11/2004 | Diaz | .................... | G06F 11/1417 713/1 |
| 2005/0073884 A1* | 4/2005 | Gonzalez | .............. | G06F 11/106 365/185.02 |
| 2006/0026340 A1* | 2/2006 | Ito | ............................ | G11C 5/04 711/103 |
| 2006/0039196 A1* | 2/2006 | Gorobets | .............. | G06F 11/106 714/E11.038 |
| 2006/0059295 A1* | 3/2006 | Suda | ..................... | G11C 16/102 711/103 |
| 2006/0087893 A1* | 4/2006 | Nishihara | .............. | G06F 12/00 365/158 |
| 2006/0224789 A1* | 10/2006 | Cho | ...................... | G11C 7/1039 710/52 |
| 2006/0245274 A1* | 11/2006 | Choi | ..................... | G06F 9/4403 365/189.12 |
| 2007/0083697 A1 | 4/2007 | Birrell | | |
| 2007/0088666 A1* | 4/2007 | Saito | ..................... | G06F 3/0656 |
| 2008/0181002 A1* | 7/2008 | Iioka | .................. | G11C 16/3418 365/185.09 |
| 2008/0307192 A1* | 12/2008 | Sinclair | ............... | G06F 12/0246 711/218 |
| 2009/0094406 A1* | 4/2009 | Ashwood | .............. | G06F 13/404 711/E12.001 |
| 2009/0240876 A1* | 9/2009 | Okuno | ................ | G06F 13/4018 711/E12.001 |
| 2009/0271562 A1* | 10/2009 | Sinclair | ............... | G06F 12/0246 711/E12.008 |
| 2010/0100666 A1* | 4/2010 | Min | ...................... | G06F 3/0679 711/E12.001 |
| 2011/0047347 A1* | 2/2011 | Li | ......................... | G06F 3/0673 711/201 |
| 2011/0072190 A1* | 3/2011 | Borracini | ............ | G06F 12/0246 711/E12.001 |
| 2011/0161559 A1* | 6/2011 | Yurzola | ................. | G06F 3/0608 711/E12.078 |
| 2011/0161560 A1* | 6/2011 | Hutchison | ........... | G06F 12/0246 711/202 |
| 2011/0231624 A1* | 9/2011 | Fukutomi | ............. | G06F 3/0659 711/E12.001 |
| 2011/0238886 A1* | 9/2011 | Post | .................... | G06F 12/0246 711/170 |
| 2011/0289255 A1* | 11/2011 | Wang | ................... | G06F 12/0246 711/E12.001 |
| 2012/0173793 A1* | 7/2012 | Bueb | .................... | G06F 9/30185 711/E12.019 |
| 2013/0145076 A1* | 6/2013 | Chiueh | ............... | G06F 12/0246 711/E12.008 |
| 2013/0198451 A1* | 8/2013 | Hyun | ..................... | G11C 16/16 711/155 |
| 2013/0311705 A1* | 11/2013 | Cheng | ................. | G06F 12/0246 711/E12.008 |
| 2014/0032817 A1* | 1/2014 | Bux | ..................... | G06F 12/0261 711/E12.008 |
| 2014/0056073 A1* | 2/2014 | Um | ........................ | G11C 16/26 365/185.12 |
| 2014/0101107 A1* | 4/2014 | Takayama | ............. | G06F 3/0679 707/649 |
| 2014/0310483 A1* | 10/2014 | Bennett | ................. | G06F 3/0644 711/154 |
| 2014/0362640 A1* | 12/2014 | Tailliet | ................... | G11C 16/16 365/185.12 |
| 2015/0113206 A1* | 4/2015 | Fitzpatrick | ......... | G11C 16/3495 711/103 |
| 2015/0186055 A1* | 7/2015 | Darragh | ............. | G11C 16/3445 711/103 |
| 2015/0186072 A1* | 7/2015 | Darragh | ............... | G06F 3/0679 711/103 |
| 2015/0187426 A1* | 7/2015 | Jeong | ................. | G11C 16/3427 365/185.11 |
| 2016/0232088 A1* | 8/2016 | Mohan | ................ | G06F 12/0246 |
| 2016/0267995 A1* | 9/2016 | Chang | ................ | G11C 16/0483 |
| 2017/0024132 A1 | 1/2017 | Jun | | |
| 2018/0101454 A1* | 4/2018 | Lee | ....................... | G06F 3/0679 |
| 2018/0240523 A1* | 8/2018 | Mangano | ................. | G11C 8/20 |
| 2018/0285562 A1* | 10/2018 | Radhakrishnan | ..... | G06F 21/554 |
| 2018/0341557 A1* | 11/2018 | Koo | ....................... | G06F 3/0619 |
| 2019/0035445 A1* | 1/2019 | Huang | ................ | G06F 12/0862 |
| 2019/0035481 A1* | 1/2019 | Kim | ....................... | G11C 16/16 |
| 2019/0095276 A1* | 3/2019 | Lin | ........................ | G06F 3/0608 |
| 2019/0179745 A1* | 6/2019 | Fukutomi | ............. | G06F 3/0659 |
| 2019/0310921 A1* | 10/2019 | Lee | ....................... | G06F 3/0659 |
| 2020/0192826 A1* | 6/2020 | Ben-Simon | ......... | G06F 12/1491 |

FOREIGN PATENT DOCUMENTS

| | | |
|---|---|---|
| TW | 200905680 | 2/2009 |
| TW | 201142589 A1 | 12/2011 |
| TW | 201305818 A1 | 2/2013 |
| TW | 201312353 A1 | 3/2013 |
| TW | 201616363 A | 5/2016 |
| TW | 201626233 A | 7/2016 |
| WO | 2013/069859 A1 | 5/2013 |

* cited by examiner

FLASH CONTROLLERS, METHODS, AND CORRESPONDING STORAGE DEVICES CAPABLE OF RAPIDLY/FAST GENERATING OR UPDATING CONTENTS OF VALID PAGE COUNT TABLE

CROSS REFERENCE TO RELATED APPLICATIONS

This continuation application claims the benefit of U.S. Non-provisional application Ser. No. 16/036,954, which was filed on 2018 Jul. 17 and is included herein by reference.

BACKGROUND OF THE INVENTION

1. Field of the Invention

The invention relates to a storage device scheme, and more particularly to methods, flash controllers, and storage devices capable of rapidly/fast generate or update contents of a valid page count table.

2. Description of the Prior Art

Generally speaking, a conventional flash controller needs to significantly update contents of a host-to-flash table and a valid page count table when is arranged to perform a trim/erase/unmap operation upon a flash memory device. For the valid page count table recording the number of valid pages, i.e. a value of valid page count, of each block, the conventional flash controller necessarily sequentially decrements the value of valid page count of each block, corresponding to a storage space to be erased by the trim/erase/unmap operation, one page by one page. Usually, the trim/erase/unmap operation may be arranged to erase a greater storage space, and thus the conventional flash controller unfortunately needs to wait for a longer time period to complete the updating of the valid page count table. Also, the conventional flash controller consumes more computation resources to update the contents of valid page count table and may degrade the performance.

SUMMARY OF THE INVENTION

Therefore one of the objectives of the invention is to provide methods, flash controllers, and storage devices capable of rapidly/fast generate or update contents of a valid page count table, to solve the above-mentioned problems.

According to embodiments of the invention, a flash controller is disclosed. The flash controller is arranged to be coupled between a flash memory device and a host device, and the flash memory device has a plurality of blocks each having a plurality of pages. The flash controller comprises a processing circuit which is configured for: receiving a trim/erase/unmap command from the host device; obtaining a storage space, which is to be erased, from the trim/erase/unmap command; comparing a space size of the storage space with a threshold to determine whether the space size is larger than the threshold; and, resetting valid page counts of the plurality of blocks of the flash memory device when the space size is larger than the threshold.

According to the embodiments, a storage device comprising the flash memory device, the flash controller, and a storage circuit is disclosed. The storage circuit is coupled to the flash controller, and is configured for storing information of a valid page count table recording the valid page counts of the plurality of blocks.

According to the embodiments, a flash controller to be coupled to a host device and a flash memory device having a plurality of blocks each having a plurality of pages is disclosed. The flash controller comprises a processing circuit which is configured for: receiving a first trim/erase/unmap command from the host device; obtaining a first storage space, which is to be erased, from the first trim/erase/unmap command; performing a first trim/erase/unmap operation and updating information of valid page counts of the plurality of blocks of the flash memory device; receiving a second trim/erase/unmap command from the host; obtaining a second storage space, which is to be erased, from the second trim/erase/unmap command; and, performing a second trim/erase/unmap operation and updating information of the valid page counts of the plurality of blocks of the flash memory device; wherein a space size of the second storage space is larger than a space size of the first storage space, and a waiting time for updating the information of the valid page counts when the second trim/erase/unmap operation is performed is shorter than a waiting time for updating the information of the valid page counts when the first trim/erase/unmap operation is performed.

According to the embodiments, a method of a flash controller to be coupled between a flash memory device and a host device is disclosed. The flash memory device has a plurality of blocks each having a plurality of pages, and the method comprises: receiving a trim/erase/unmap command from the host device; obtaining a storage space, which is to be erased, from the trim/erase/unmap command; comparing a space size of the storage space with a threshold to determine whether the space size is larger than the threshold; and, resetting valid page counts of the plurality of blocks of the flash memory device when the space size is larger than the threshold.

According to the embodiments, a method of a flash controller to be coupled to a host device and a flash memory device having a plurality of blocks each having a plurality of pages is disclosed. The method comprises: receiving a first trim/erase/unmap command from the host device; obtaining a first storage space, which is to be erased, from the first trim/erase/unmap command; performing a first trim/erase/unmap operation and updating information of valid page counts of the plurality of blocks of the flash memory device; receiving a second trim/erase/unmap command from the host; obtaining a second storage space, which is to be erased, from the second trim/erase/unmap command; and, performing a second trim/erase operation and updating information of the valid page counts of the plurality of blocks of the flash memory device; wherein a space size of the second storage space is larger than a space size of the first storage space, and a waiting time for updating the information of the valid page counts when the second trim/erase/unmap operation is performed is shorter than a waiting time for updating the information of the valid page counts when the first trim/erase/unmap operation is performed.

According to the embodiments, a flash controller to be coupled between a flash memory device and a host device is disclosed. The flash memory device has a plurality of blocks each having a plurality of pages. The flash controller comprises a processing circuit which is configured for: receiving a trim/erase/unmap command from the host device; obtaining a storage space, which is not to be erased, from the trim/erase/unmap command; comparing a space size of the storage space with a threshold to determine whether the space size is smaller than the threshold; and resetting valid page counts of the plurality of blocks of the flash memory device when the space size is smaller than the threshold.

According to the embodiments, a method of a flash controller to be coupled between a flash memory device and a host device is disclosed. The flash memory device has a plurality of blocks each having a plurality of pages. The method comprises: receiving a trim/erase/unmap command from the host device; obtaining a storage space, which is not to be erased, from the trim/erase/unmap command; comparing a space size of the storage space with a threshold to determine whether the space size is smaller than the threshold; and resetting valid page counts of the plurality of blocks of the flash memory device when the space size is smaller than the threshold.

According to the embodiments, when the flash controller receives the trim/erase/unmap command, the flash controllers and methods are arranged to perform a corresponding trim/erase/unmap operation upon the flash memory device, and can be arranged to rapidly/fast generate or update the contents of VPC table so as to save more computation as far as possible thereby making a great improvement of performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
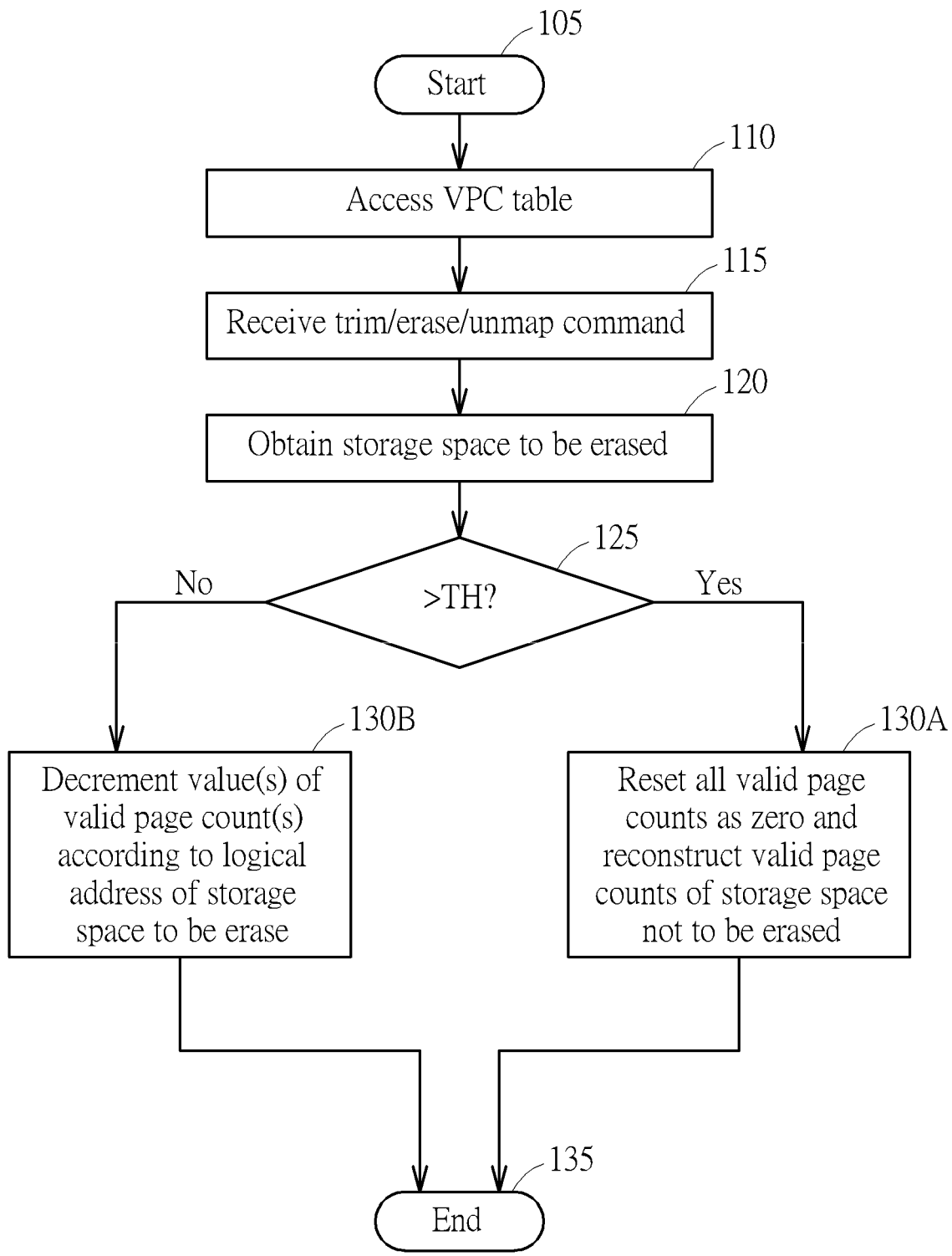
FIG. 1 is a diagram showing a flowchart of a method applied into a flash controller capable of rapidly/fast generating information/contents of valid page counts when receiving a trim/erase/unmap command sent from a host device according to an embodiment of the invention.

Refer to FIG. 1, which is a diagram showing a flowchart of a method applied into a flash controller and capable of rapidly/fast generating information/contents of valid page counts when receiving a trim/erase/unmap command sent from a host device according to an embodiment of the invention. For example, the flash controller is to be coupled between the host device and a flash memory device such as a circuit die or chip. In addition, the flash controller and the flash memory device may be included within a solid-state drive (SSD) device. The flash controller usually adopts/employs a host-to-flash (H2F) table and a valid page count (VPC) table to record used logical addresses and the number of valid page(s) for each block in the flash memory device respectively. When the flash controller receives the trim/erase/unmap command, the flash controller is arranged to perform a corresponding trim/erase/unmap operation upon the flash memory device, and the flash controller needs to update contents of H2F table and contents of VPC table. This method is to make the flash controller rapidly/fast generate or update the contents of VPC table so as to save more computation as far as possible thereby making a great improvement of performance.

Provided that substantially the same result is achieved, the steps of the flowchart shown in FIG. 1 need not be in the exact order shown and need not be contiguous, that is, other steps can be intermediate. Steps are detailed in the following:

Step 105: Start;

Step 110: Access information of VPC table;

Step 115: Receive a trim/erase/unmap command from the host device;

Step 120: Obtain a storage space (e.g. a logical storage space), which is to be erased, from the trim/erase/unmap command;

Step 125: Compare a space size of the storage space with a threshold to determine whether the space size is larger than the threshold; if the space size is larger than the threshold TH, the flow proceeds to Step 130A, otherwise, the flow proceeds to Step 130B;

Step 130A: Reset valid page counts of a plurality of blocks of the flash memory device as zero and reconstruct valid page counts of a different storage space which is not to be erased by the trim/erase/unmap command;

Step 130B: Decrement at least one valid page count of at least one block according to logical address of the storage space to be erased; and Step 135: End.

Figure 2:
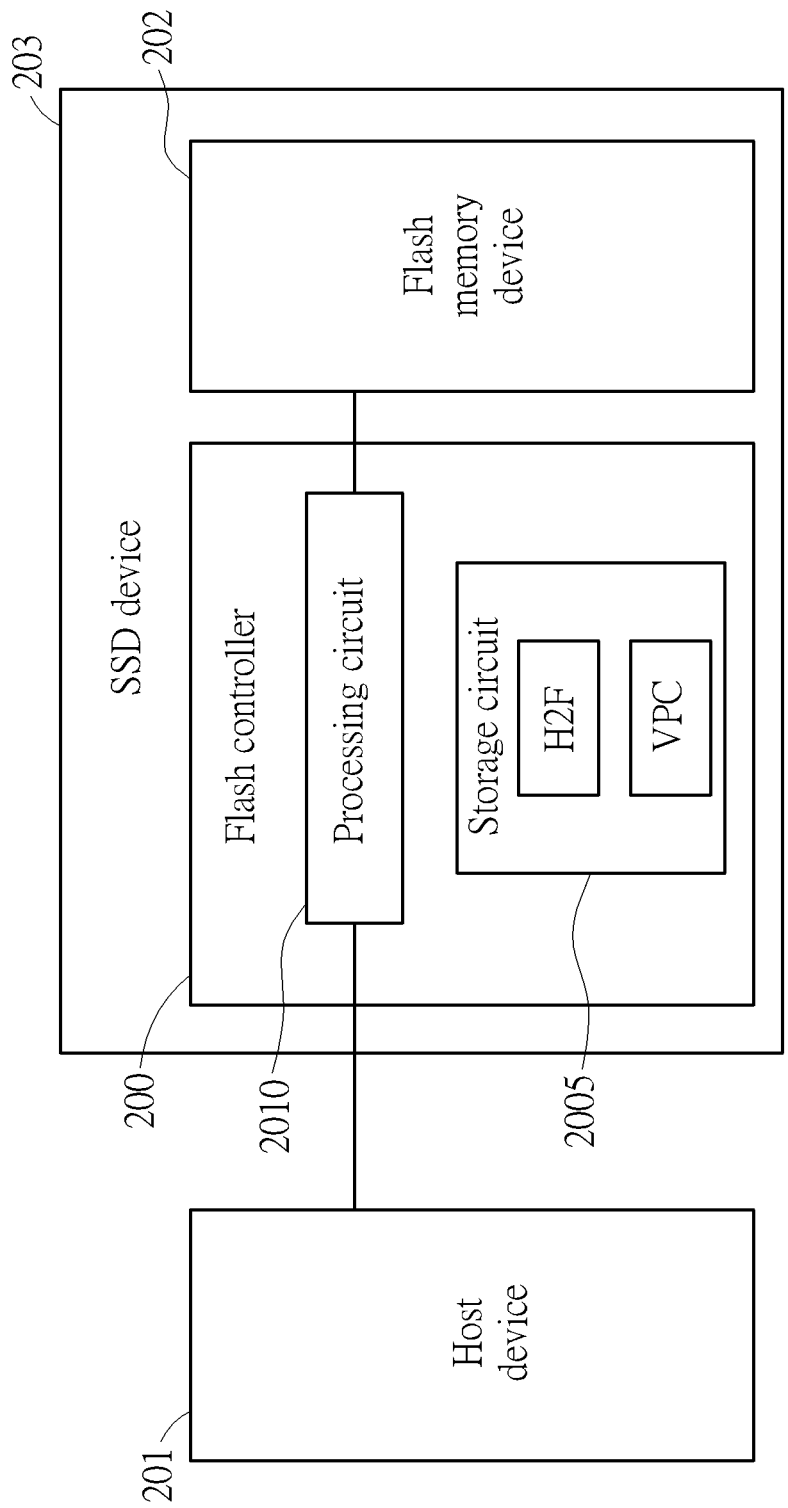
FIG. 2 is a block diagram of flash controller coupled between host device and flash memory device according to an embodiment of the flowchart of FIG. 1.

FIG. 2 is a block diagram of flash controller 200 coupled between host device 201 and flash memory device 202 according to an embodiment of the flowchart of FIG. 1. The flash memory device 202 such as a flash die or flash chip comprises a plurality of blocks each having a plurality of pages. For example, the flash memory device 202 may be a NAND flash memory chip (but not limited). In addition, the flash controller 200 and flash memory device 202 may be included within a storage device 203 such as an SSD device, SD card, USB drive, or embedded storage (but not limited). The flash controller 200 comprises a storage circuit 2005 and a processing circuit 2010. The storage circuit 2005 for example is a random access memory (but not limited) and used for storing information/contents of VPC table. The flash memory device 202 has a plurality of blocks (storage blocks) and each block has a plurality of pages (storage pages). The corresponding fields/items of VPC table are used to record the values of valid page counts for all blocks of the flash memory device 202 respectively.

In practice, in this embodiment, the storage circuit 2005 can be used for storing information/contents of VPC table and information/contents of H2F table. This is not meant to be a limitation. In another embodiment, the two tables or either one of the tables may be stored in a different memory device externally coupled to the flash controller 200.

The processing circuit 2010 in Step 110 is arranged to access information of the VPC table recording values of valid page counts of the plurality of blocks, e.g. all blocks of the flash memory device 202. The processing circuit 2010 in Step 115 receives the trim/erase/unmap command from the host device 201 such as a computer. For example, the host device 201 may request the flash controller 200 to erase a particular storage space by sending the trim/erase/unmap command to the flash controller 200 if the flash controller 200 supports the function of trim/erase/unmap command.

In practice, the processing circuit 2010 of flash controller 200 is arranged to program one page data into one page of one block of the flash memory device 202 every time when initiating a data programming operation. The processing circuit 2010 of flash controller 200 is arranged to erase contents of all pages of a block of the flash memory device 202 every time when initiating a data erase operation. That is, the flash controller 200 is arranged to program one page each time and erase one block each time respectively.

The flash controller 200 includes the host-to-flash (H2F) table (or referred as a logical-to-physical (L2P) table). The processing circuit 2010 of flash controller 200 may sequentially assign different page data with different logical addresses. For programming one page data, an item of the H2F table can be used for recording which physical page of which physical block is arranged to store such page data. In practice, the H2F table comprises a number of items respectively corresponding to all physical pages of all physical blocks of the flash memory device 202. When the flash controller 200 programs one page data into one page of one block, the processing circuit 2010 of flash controller 200 is arranged to record a logical address used by such page data at a correspondingly item associated with of the page of the block in the H2F table. When programming a different page data into a different page, the processing circuit 2010 of flash controller 200 is arranged to record a corresponding logical address of the different page data at a corresponding item associated with of the different page in the H2F table. Thus, when later accessing the flash memory device 202 to retrieve a certain page data, the flash controller 200 can look up the H2F table based on the logical address of the certain page data to know which physical storage page of which physical storage block is used for storing such page data and then correctly retrieves or reads such page data.

The flash controller 200 also includes the VPC table which comprises a number of items wherein each item is used for storing a total number of valid page(s) of a corresponding block. Basically, the number of items in the VPC table is equal to the number of blocks in the flash memory device 202; however, this is not meant to be a limitation. A number of valid page(s), i.e. the value of a valid page count, for a specific block is incremented by one by the processing circuit 2010 of flash controller 200 when the flash controller 200 programs one page data into an empty page of the specific block and records a particular logical address at a corresponding item associated with of the empty page in the H2F table. Simultaneously, if the same particular logical address had been used by other page data ago, a valid page count for a different block is decremented by one by the processing circuit 2010 of flash controller 200 when the particular logical address had recorded at an item associated with of a page of the different block in the H2F table.

In addition, the flash memory device 202 is designed to comprise a user data storage area and a reserved storage area (e.g. a system area and a spare area). The user data storage area is used for storing user data and is usually or almost greater than half of the total storage space/capacity of the flash memory device 202. The reserved storage area is used for storing important files such as system files, an operating system boot process, and so on. For example, ten percent of the total storage space may be used as the reserved storage area, and other percent of the total storage space is used as the user data storage area; however, this is not intended to be a limitation.

The host device 201 may send the trim/erase/unmap command to the flash controller 200 to erase all blocks of the flash memory device 200 excluding the reserved storage area. For example, the host device 201 may send such trim/erase/unmap command to the flash controller 200 when deciding to clear or erase contents of blocks if the flash memory device 202 is initially used for the first time or has become dirty. It should be noted that the timing of receiving the trim/erase/unmap command from a host is not meant to be a limitation. The flash controller 200 may receive such command in any possible situations.

In practice, when the flash controller 200 receives the trim/erase/unmap command which indicates erasing blocks of the user data storage area rather than the reserved storage area, the processing circuit 2010 of flash controller 200 is arranged to reset values of all valid page counts of all blocks of the flash memory device 202 as zero. That is, the flash controller 200 resets all valid page counts of all blocks including blocks of the reserved storage area as zero. Then, the processing circuit 2010 of flash controller 200 reconstructs the valid page counts of the blocks of the reserved storage area. The computation time required by reconstructing the valid page counts of the blocks of the reserved storage area is significantly shorter than that required by directly decrementing the valid page counts of the blocks of the user data storage area since the space of reserved storage area is smaller that of user data storage area. Thus, the flash controller 200 can achieve rapidly or fast generating information/contents of VPC table.

For example, the operation of reconstructing a valid page count of a block is performed by calculating and accumulating (incrementing) the number of valid page(s) of such block one page by one page, and is different from the operation of directly decrementing the number of invalid page(s) of a block one page by one page. For an example, to simply describe the operations, it is assumed that a flash memory device includes four blocks BLK1, BLK2, BLK3, BLK4 each having four pages (sixteen pages), and totally there exist ten logical addresses LBA0-LBA9; however, this is not intended to be a limitation.

The flash controller 200 may sequentially use the logical addresses LBA0-LBA9 to program different data units (different page data) into pages of blocks of the flash memory device. For example, if ten data units are sequentially programed into the flash memory device, in the H2F table, the processing circuit 2010 may record the four items corresponding to the block BLK1 as LBA0, LBA1, LBA2, LBA3, and may record the four columns corresponding to the block BLK2 as LBA4, LBA5, LBA6, LBA7. Similarly, the two columns corresponding to the block BLK3 may recorded as LBA8, LBA9, and the remaining two columns are empty. The four columns corresponding to the block BLK4 are empty. Accordingly, in the VPC table, the valid page counts of blocks BLK1, BLK2, BLK3, and BLK4 are respectively recorded as four, four, two, and zero. The example of H2F table with the VPC table can be shown as below:

| H2F table | BLK1 | BLK2 | BLK3 | BLK4 |
|---|---|---|---|---|
| Page 1 | LBA0 | LBA4 | LBA8 | |
| Page 2 | LBA1 | LBA5 | LBA9 | |
| Page 3 | LBA2 | LBA6 | | |
| Page 4 | LBA3 | LBA7 | | |
| VPC table | 4 | 4 | 2 | 0 |

Later, the processing circuit 2010 may program an additional data unit into the flash memory device, and in the H2F table the processing circuit 2010 is arranged to record the third item corresponding to the block BLK3 as LBA0, and the first item corresponding to the block BLK1 previously recording LBA0 becomes invalid, i.e. an invalid page. The processing circuit 2010 of flash controller 200 decrements the valid page count of the block BLK1 and increments the valid page count of the block BLK3 according to currently valid pages. Thus, the in the VPC table, the valid page counts of blocks BLK1, BLK2, BLK3, and BLK4 become three, four, three, and zero. The example of H2F table with the VPC table can be shown as below:

| H2F table | BLK1 | BLK2 | BLK3 | BLK4 |
|---|---|---|---|---|
| Page 1 | LBA0 (invalid) | LBA4 | LBA8 | |
| Page 2 | LBA1 | LBA5 | LBA9 | |
| Page 3 | LBA2 | LBA6 | LBA0 (valid) | |
| Page 4 | LBA3 | LBA7 | | |
| VPC table | 3 | 4 | 3 | 0 |

In this situation, if the host device 201 sends the trim/erase/unmap command to the flash controller 200, and the trim/erase/unmap command indicates to trim or erase a storage space having logical addresses from LBA1 to LBA9. The processing circuit 2010 of flash controller 200 is arranged to obtain logical address(es) of another different storage space which is not erased or trimmed by the trim/erase/unmap command. For example, if the trim/erase/unmap command is to erase a storage space of a user data storage area, the different storage space which is not erased may be a reserved storage area. In this case, the flash controller 200 would obtain the logical address LBA0 which is not to be erased.

The processing circuit 2010 of flash controller 200 clears/resets the storage space of logical addresses from LBA1 to LBA9 which are recorded in the H2F table, and also the flash controller 200 is arranged to clear/reset the values of all valid page counts of all blocks in the VPC table as zero respectively. The flash controller 200 then is arranged to calculate and accumulate all valid pages to reconstruct the valid page count(s) in the VPC table according to at least one logical address of the obtained storage space which is not to be erased. The processing circuit 2010 is arranged to check whether storage pages corresponding to the storage space, which is not to be erased, are valid or invalid one page by one page. Equivalently, the processing circuit 2010 is arranged to increment valid page count(s) of a certain block(s) corresponding to the storage space which is not to be erased. For example, in the above case, correct information of the VPC table can be rapidly reconstructed as long as the flash controller 200 increments the value of valid page count of block BLK 3 from zero to one after the values of all valid page counts are reset as zero. The example of H2F table with the VPC table can be shown as below:

Resetting VPC table:

| H2F table | BLK1 | BLK2 | BLK3 | BLK4 |
|---|---|---|---|---|
| Page 1 | | | | |
| Page 2 | | | | |
| Page 3 | | | LBA0 | |
| Page 4 | | | | |
| VPC table | 0 | 0 | 0 | 0 |

Reconstructing VPC table:

| H2F table | BLK1 | BLK2 | BLK3 | BLK4 |
|---|---|---|---|---|
| Page 1 | | | | |
| Page 2 | | | | |
| Page 3 | | | LBA0 | |
| Page 4 | | | | |
| VPC table | 0 | 0 | 1 | 0 |

Compared to a conventional scheme, it may need to obtain correct information of the VPC table by decrementing the values of valid page counts of corresponding blocks for nine times according to the logical addresses LBA1 to LBA9 which are to be erased since the conventional scheme also needs to check the nine pages corresponding to the logical addresses LBA1 to LBA9 sequentially and calculate the values of valid page counts one page by one page. That is, in the embodiments of the invention, the flash controller 200 can rapidly/fast generate correct information of the VPC table by resetting the values of all valid page counts and then calculating and accumulating value(s) of valid page count(s) according to a storage space which is not to be erased. Further, it is should be noted that the examples of above-mentioned tables are merely used for illustrative purposes and are not meant to be limitations.

This operation is particularly useful when the trim/erase/unmap command is to erase a storage space which is greater than half of a particular storage space, e.g. the whole/total storage space, i.e. greater than the half of the total physical storage space of the flash memory device or in other embodiment for example the half of the user data area (but not limited). In another embodiment, the processing circuit 2010 of flash controller 200 is arranged to determine whether the size of a storage space to be erased by a trim/erase/unmap command is greater than a specific threshold TH such as half of the whole or total physical storage space or half of the user data area. If the size of storage space to be erased is greater than the specific threshold TH, the processing circuit 2010 of flash controller 200 is arranged to reset the values of all valid page counts and then increment value(s) of valid page count(s) according to other different storage space which is not to be erased. If the size of storage space to be erased is smaller than the specific threshold TH, the processing circuit 2010 of flash controller 200 is arranged to decrement the values of valid page count(s) according to the storage space to be erased, so as to generate information or contents of VPC table.

Figure 3:
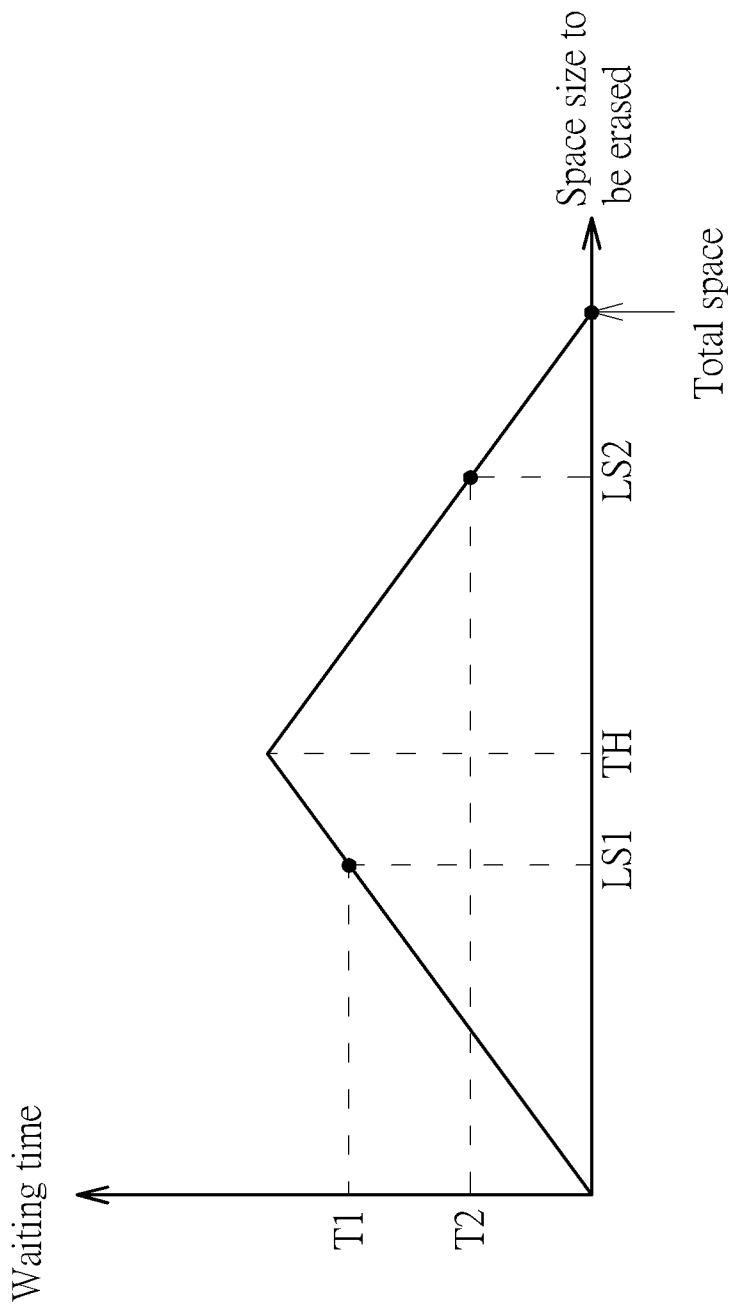
FIG. 3 is a diagram illustrating the performance of the flash controller when receiving different trim/erase command to erase storage spaces having different space sizes.

Refer to FIG. 3, which is a diagram illustrating the performance of the flash controller 200 when receiving different trim/erase/unmap command to erase storage spaces having different space sizes. As shown in FIG. 3, the horizontal axis means the different sizes of storage space or physical storage space to be erased, and the vertical axis means the waiting times for completing the computation of contents of VPC table when receiving a trim/erase/unmap command indicating to erase a size of a storage space size defined in the horizontal axis.

For example, in a first example, the processing circuit 2010 of flash controller 200 receives a first trim/erase/unmap command from the host device 201, and then is arranged to perform a first trim/erase/unmap operation upon the flash memory device 202. The processing circuit 2010 of flash controller 200 obtains a first storage space, to be erased, from the first trim/erase/unmap command. The size LS1 of first storage space in this example is smaller than the specific threshold TH, e.g. half of the whole storage space. The processing circuit 2010 of flash controller 200 is arranged to clear the items recording the logical addresses of first storage space in the H2F table and to directly decrement the values of valid page counts corresponding to logical addresses included by the first storage space so as to generate or update information/contents of VPC table. This trim/erase/unmap command operation needs to wait for the time period T1. Additionally, in a second example, the processing circuit 2010 of flash controller 200 receives a second trim/erase/unmap command from the host device 201, and then is arranged to perform a second trim/erase/unmap operation upon the flash memory device 202. The processing circuit 2010 of flash controller 200 obtains a second storage space, to be erased, from the second trim/erase/unmap command. The size LS2 of second storage space in this example is greater than the specific threshold TH, e.g. half of the whole storage space. The processing circuit 2010 of flash controller 200 is arranged to clear the items recording the logical addresses of second storage space in the H2F table, to reset values of all valid page counts of all blocks in VPC table, and to reconstruct the values of valid page counts corresponding to the other logical addresses excluded by the second storage space by incrementing the values of valid page counts corresponding to the other logical addresses. This trim/erase/unmap command operation merely needs to wait for the time period T2 which is shorter than the time period T1.

Compared to the conventional scheme, if the conventional scheme needs to wait for the time period T1 to complete the computation of VPC table for the storage space size LS1 to be erased, then the conventional scheme necessarily needs to wait for a longer time period to complete the computation of VPC table for the storage space size LS2 to be erased. For the conventional scheme, such longer time period is usually equivalent to the time period T1 multiplied by the value of LS2 divided by LS1. In the embodiments of the invention, even though the flash controller 200 in the second example is arranged to erase a greater storage space LS2 having more logical addresses, by above-mentioned resetting and reconstructing steps, the flash controller 200 can save more data computation/calculation, and the time period T2 is shorter than the time period T1.

Further, in another embodiment, the value of threshold TH is adjustable and can be determined by users. Further, the storage circuit 2005 of FIG. 2 may be configured to be excluded by the flash controller 200 and to be externally connected to the flash controller 200. This modification also falls within the scope of the invention.

Figure 4:
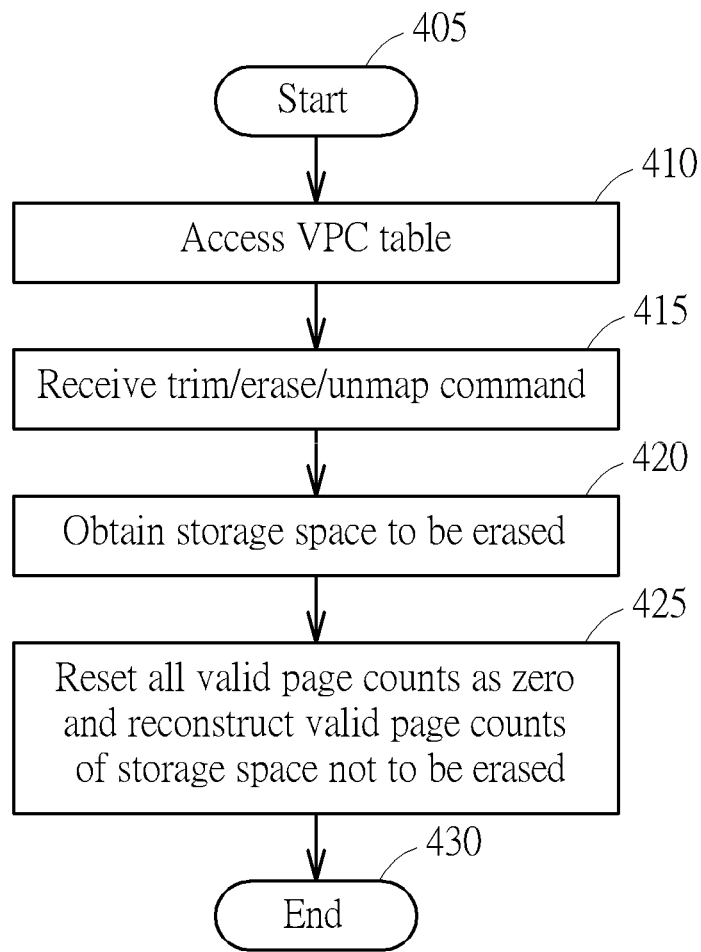
FIG. 4 is a diagram showing a flowchart of a method applied into a flash controller capable of rapidly/fast generating information/contents of valid page counts when receiving a trim/erase/unmap command sent from a host device according to another embodiment of the invention.

Additionally, in other embodiment, it may be assumed that a trim/erase/unmap command sent from the host device 201 may be default arranged to erase a greater logical/physical space having the size greater than half of the whole physical storage size. The processing circuit 2010 of flash controller 200 may be arranged to perform the above-mentioned resetting and reconstructing steps for the VPC table once receiving the trim/erase/unmap command. That is, the processing circuit 2010 may not be arranged to determine whether the size of a storage space to be erased is greater than the threshold TH. This modification also obeys the spirit of the invention. FIG. 4 shows a flowchart of such modification embodiment. Detailed description is not described for brevity.

Figure 5:
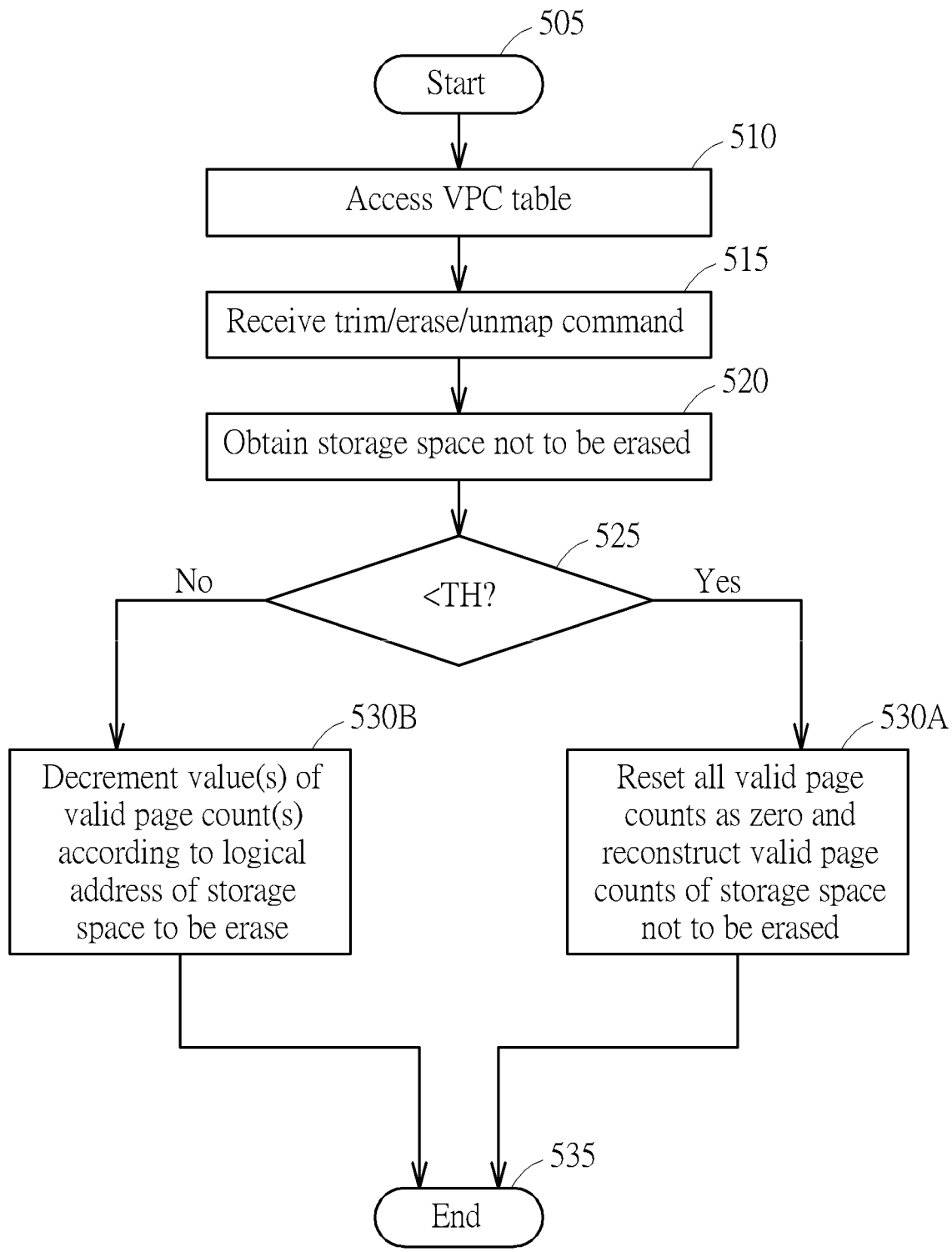
FIG. 5 is a diagram showing a flowchart of a method applied into a flash controller capable of rapidly/fast generating information/contents of valid page counts when receiving a trim/erase/unmap command sent from a host device according to a third embodiment of the invention.

Further, in other embodiment, the processing circuit 2010 can equivalently obtain a storage space, which is not to be erased, from the trim/erase/unmap command when receiving the trim/erase/unmap command which indicate a another storage space to be erased. For example, for the space corresponding to the addresses LBA0-LBA9, if the trim/erase/unmap command is arranged to erase the space associated with the addresses LBA1-LBA9, then the processing circuit 2010 can obtain a corresponding space not to be erased, i.e. the space corresponding to address LBA0. When obtaining the storage space which is not to be erased, the processing circuit 2010 is arranged to compare a space size of the storage space (not to be erased) with a threshold (e.g. the threshold TH mentioned above) to determine whether the space size is smaller than the threshold, and then to reset valid page counts of the plurality of blocks of the flash memory device 202 when the space size is smaller than the threshold. FIG. 5 is a diagram showing a flowchart of another method applied into the flash controller 200 and capable of rapidly/fast generating information/contents of valid page counts when receiving a trim/erase/unmap command sent from the host device 201 according to a third embodiment of the invention. Provided that substantially the same result is achieved, the steps of the flowchart shown in FIG. 5 need not be in the exact order shown and need not be contiguous, that is, other steps can be intermediate. Steps are detailed in the following:

Step 505: Start;

Step 510: Access information of VPC table;

Step 515: Receive a trim/erase/unmap command from the host device;

Step 520: Obtain a storage space, which is not to be erased, from the trim/erase/unmap command;

Step 525: Compare a space size of the storage space with a threshold to determine whether the space size is smaller than the threshold; if the space size is smaller than the threshold TH, the flow proceeds to Step 530A, otherwise, the flow proceeds to Step 530B;

Step 530A: Reset valid page counts of a plurality of blocks of the flash memory device as zero and reconstruct valid page counts of a different storage space which is not to be erased by the trim/erase/unmap command;

Step 530B: Decrement at least one valid page count of at least one block according to logical address of the storage space to be erased; and Step 535: End.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash controller to be coupled between a flash memory device and a host device, the flash memory device having a plurality of blocks each having a plurality of pages, and the flash controller comprises:

a processing circuit, configured for:

receiving a trim/erase/unmap command from the host device;

obtaining a first storage space, which is to be erased, from the trim/erase/unmap command;

directly clearing a value of at least one valid page count of at least one block of a second storage space which is not to be erased as zero from a specific value, the specific value being different from zero and being different from one; and after the value of the at least one valid page count of the at least one block of the second storage space is cleared as zero, reconstructing the value of the at least one valid page count of the at least one block of the second storage space from zero to the specific value which is different from zero and different from one by incrementing the value of the at least one valid page count of the at least one block of the second storage space by one for multiple times.

2. The flash controller of claim 1, wherein the processing circuit is arranged for:
comparing a space size of the first storage space with a threshold to determine whether the space size is larger than the threshold; and
determining to reset the value of at least one valid page count of the at least one block of the second storage space which is not to be erased as zero from the specific value when the space size of the first storage space is larger than the threshold.

3. The flash controller of claim 2, wherein the threshold is half of a capacity of the flash memory device.

4. The flash controller of claim 2, wherein a capacity of the flash memory device comprises a data area and a system area, and the threshold is half of the data area.

5. The flash controller of claim 2, wherein the processing circuit is arranged to decrement a value of at least one valid page count of at least one block according to at least one logical address of the first storage space to be erased when the space size is smaller than the threshold.

6. The flash controller of claim 1, wherein the processing circuit is arranged for:
resetting valid page counts of the plurality of blocks of the flash memory device as zero when the space size of the first storage space is larger than the threshold and then reconstructing the information of valid page counts of the second storage space which is not to be erased by incrementing the value of the at least one valid page count of the at least one block of the second storage space according to at least one logical address of the second storage space.

7. The flash controller of claim 1, further comprising:
a storage circuit, configured for storing information of a valid page count table recording valid page counts of the plurality of blocks.

8. The flash controller of claim 1, wherein the processing circuit is arranged to reset all valid page counts of all blocks in the flash memory device as zero when the space size is larger than the threshold, and the all blocks of the flash memory device includes a portion of blocks corresponding to a reserved area recording an operating system boot process or a system file.

9. The flash controller of claim 1, wherein a capacity of the flash memory device comprises a user data storage area and a system area; the first storage space to be erased comprises at least one portion of the user data storage area, and the second storage space not to be erased comprises the system area.

10. A storage device, comprising:
a flash memory device having a plurality of blocks each having a plurality of pages;
the flash controller of claim 1; and
a storage circuit, coupled to the flash controller, configured for storing information of a valid page count table recording valid page counts of the plurality of blocks.

11. A method of a flash controller to be coupled between a flash memory device and a host device, the flash memory device having a plurality of blocks each having a plurality of pages, and the method comprises:
receiving a trim/erase/unmap command from the host device;
obtaining a first storage space, which is to be erased, from the trim/erase/unmap command;
directly clearing a value of at least one valid page count of at least one block of a second storage space which is not to be erased as zero from a specific value, the specific value being different from zero and being different from one; and
after the value of the at least one valid page count of the at least one block of the second storage space is cleared as zero, reconstructing the value of the at least one valid page count of the at least one block of the second storage space from zero to the specific value which is different from zero and different from one by incrementing the value of the at least one valid page count of the at least one block of the second storage space by one for multiple times.

12. The method of claim 11, further comprising:
comparing a space size of the first storage space with a threshold to determine whether the space size is larger than the threshold; and
determining to reset the value of at least one valid page count of the at least one block of the second storage space which is not to be erased as zero from the specific value when the space size of the first storage space is larger than the threshold.

13. The method of claim 12, wherein the threshold is half of a capacity of the flash memory device.

14. The method of claim 12, wherein a capacity of the flash memory device comprises a data area and a system area, and the threshold is half of the data area.

15. The method of claim 12, further comprising:
decrementing a value of at least one valid page count of at least one block according to at least one logical address of the first storage space to be erased when the space size is smaller than the threshold.

16. The method of claim 11, further comprising:
resetting valid page counts of the plurality of blocks of the flash memory device as zero when the space size of the first storage space is larger than the threshold and then reconstructing the information of valid page counts of the second storage space which is not to be erased by incrementing the value of the at least one valid page count of the at least one block of the second storage space according to at least one logical address of the second storage space.

17. The method of claim 11, further comprising:
using a storage circuit to store information of a valid page count table recording valid page counts of the plurality of blocks.

18. The method of claim 11, further comprising:
resetting all valid page counts of all blocks in the flash memory device as zero when the space size is larger than the threshold, wherein the all blocks of the flash memory device includes a portion of blocks corresponding to a reserved area recording an operating system boot process or a system file.

19. The method of claim 11, wherein a capacity of the flash memory device comprises a user data storage area and a system area; the first storage space to be erased comprises at least one portion of the user data storage area, and the second storage space not to be erased comprises the system area.

* * * * *